(12) United States Patent
Wunderlich

(10) Patent No.: US 6,343,023 B1
(45) Date of Patent: Jan. 29, 2002

(54) SYSTEM AND METHOD FOR RECOVERING ENERGY IN POWER CONVERTERS

(75) Inventor: Ronnie A. Wunderlich, Endicott, NY (US)

(73) Assignee: Celestica International Inc., Toronto (CA)

( * ) Notice: Subject to any disclaimer, the term of this patent is extended or adjusted under 35 U.S.C. 154(b) by 0 days.

(21) Appl. No.: 09/736,235

(22) Filed: Dec. 15, 2000

(51) Int. Cl.⁷ ............................................. H02M 3/335
(52) U.S. Cl. ...................................................... 363/16
(58) Field of Search ........................ 363/15, 16, 21.06, 363/21.14, 56.01, 95, 97, 131

(56) References Cited

U.S. PATENT DOCUMENTS

| | | | |
|---|---|---|---|
| 5,132,889 A | * | 7/1992 | Hitchcock et al. ............ 363/17 |
| 5,274,543 A | | 12/1993 | Loftus, Jr. |
| 5,734,563 A | | 3/1998 | Shinada |
| 5,870,299 A | | 2/1999 | Rozman |
| 5,872,705 A | | 2/1999 | Loftus, Jr. |
| 5,886,881 A | * | 3/1999 | Xia et al. ...................... 363/21 |
| 6,091,616 A | * | 7/2000 | Jacobs et al. ................ 363/127 |

* cited by examiner

*Primary Examiner*—Matthew Nguyen
(74) *Attorney, Agent, or Firm*—Blake Cassels & Graydon LLP; Alfred A. Macchiore

(57) ABSTRACT

A power loss reduction circuit and method for use in an output stage of a voltage converter is provided. The circuit has one transistor associated with a first output terminal of the output stage and ground. There is also a clamping circuit associated with the first output terminal. There is also a second transistor with a second conduction path associated with a second output terminal of the output stage and ground. The second transistor has a second control terminal controlled by a second control signal. Each of the first and second transistors has a lower voltage drop than a voltage drop for a Schottky diode. There is also a second clamping circuit associated with the second output terminal. There is also an energy storage device associated with the first and second clamping circuits to store energy from the first and second ringing signals.

17 Claims, 7 Drawing Sheets

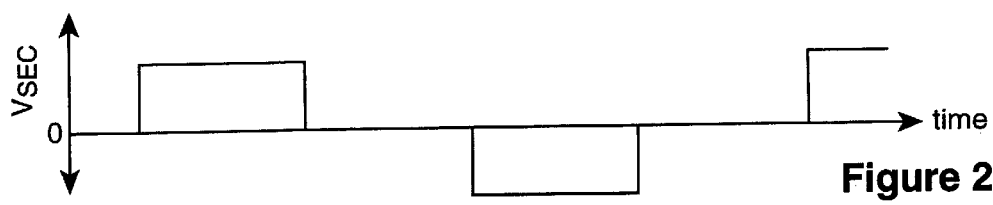
Figure 2A
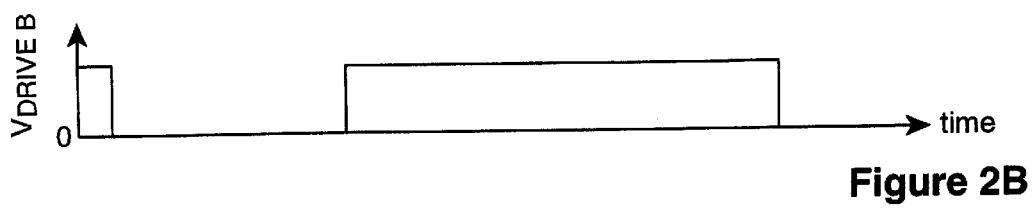
Figure 2B
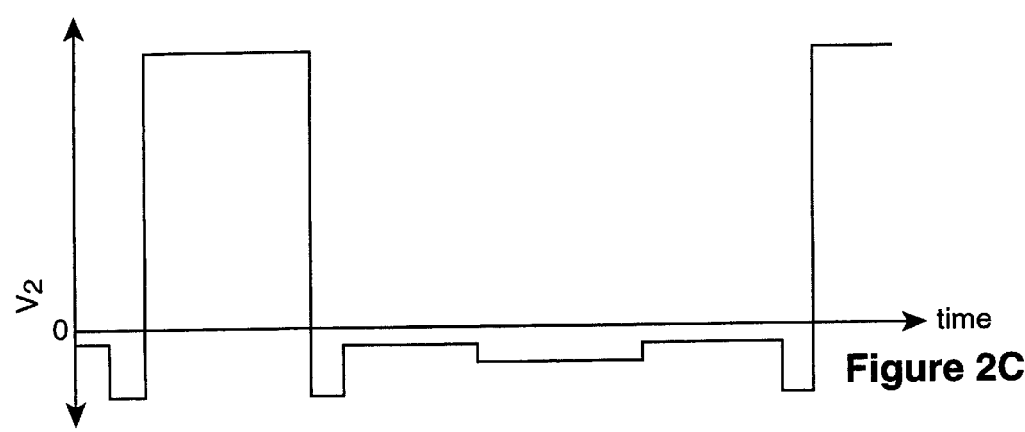
Figure 2C
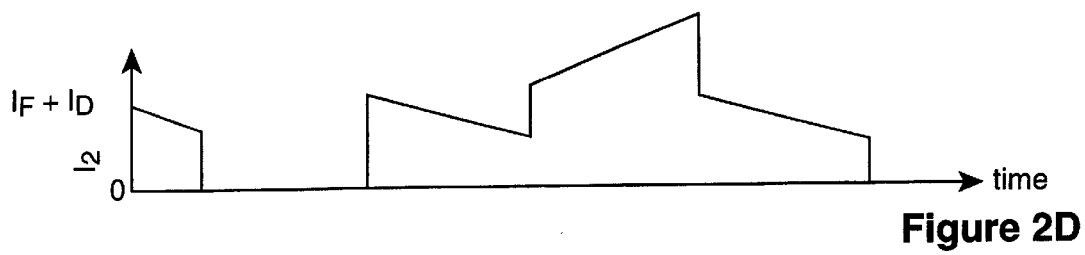
Figure 2D
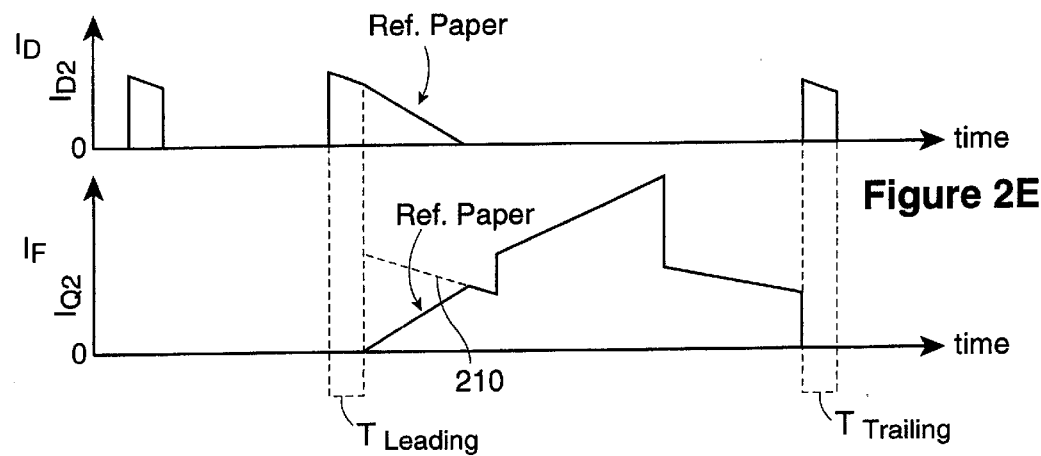
Figure 2E
Figure 2F

SYSTEM AND METHOD FOR RECOVERING ENERGY IN POWER CONVERTERS

FIELD OF THE INVENTION

The present invention relates to a system and method for recovering energy in power converters. In particular, the invention provides a circuit and method for recovering energy using a circuit having synchronous rectifiers.

BACKGROUND OF INVENTION

DC to DC (DC/DC) voltage converters provide a regulated DC output voltage to electronic devices and circuits from a different level DC input voltage. In the creation of an output DC voltage signal from the input voltage signal, power is invariably lost.

Generally, it is a goal to reduce power losses in a converter, thereby improving the efficiency of the converter and to improve thermal performance, i.e. have a tolerable operating temperature for the converter.

Power losses may be reduced by utilizing synchronous rectifiers in the output stage of the converter. Synchronous rectifiers are output rectifier circuits comprising low $R_{ds}$-on FETs in parallel with Schottky diodes at each output terminal. Each Schottky diode prevents the body diode of the synchronous rectifier from turning on when the FET is off. The FET is turned on by a control circuit connected to its gate when current flows in the forward direction of its parallel Schottky diode. However, in order for the synchronous rectifier to be effective, the on voltage drop of the FET at full load current must be less than that of the Schottky diode forward drop. This enables current to flow through the FET and not through the Schottky diode when the FET is on. Accordingly, the synchronous rectifier provides a lower voltage drop than the typical 0.3 volt drop associated with Schottky diodes, thus improving the efficiency.

General background on known methods of improving power loss in circuits is found in "Conduction Power Loss in MOSFET Synchronous Rectifier with Parallel-Connected Schottky Barrier Diode" in IEEE Transactions on Power Electronics Vol. 13, No 4, July 1998 which is incorporated into this application by reference.

However there remains a need for more efficient circuits in DC/DC converters to reduce power losses.

SUMMARY OF INVENTION

In a first aspect, the invention provides a power loss reduction circuit for use in an output stage of a voltage converter. The output stage has an output winding having first and second output terminals. The output stage produces an alternating cyclic signal at the first output terminal and a second complementary alternating cyclic output signal at the second output terminal. The circuit has one transistor with a conduction path associated with the first output terminal and ground. The transistor has a control terminal to regulate a first signal flowing through the conduction path by a first control signal. Also the transistor has a lower voltage drop in its conduction path than one for a Schottky diode. There is also a clamping circuit associated with the first output terminal for reducing a ringing signal present on the first signal when the first alternating cyclic signal becomes positive. There is also a second transistor with a second conduction path associated with the second output terminal and ground. The second transistor has a second control terminal to regulate a second signal flowing through its conduction path by a second control signal. The second transistor has a lower voltage drop in its second conduction path than one for a Schottky diode. There is also a second clamping circuit associated with the second output terminal for reducing another ringing signal present on the second signal when the second alternating cyclic signal becomes positive. There is also an energy storage device associated with the first and second clamping circuits to store energy from the first and second ringing signals.

The power loss reduction circuit may have diodes in the first and second clamping circuits. Further, the circuit may use a capacitor for the energy storage device and may use FETs for the first and second transistors. Further the FETs may be MOSFETs.

The power loss reduction circuit may use energy stored in the capacitor to drive the first and second transistors.

The power loss reduction circuit may further have a third transistor connected in parallel with the first transistor and a fourth transistor connected in parallel with the second transistor. The third transistor is controlled by the first control signal and the fourth transistor controlled by the second control signal. The third and fourth transistors may be FETs.

The power loss reduction circuit may have the output winding and the first and second output terminal arranged in a center tap configuration.

The power loss reduction circuit may have the output winding and the first and second output terminal arranged in a current doubler configuration.

In another aspect, the invention provides a DC/DC voltage converter. The voltage converter comprises an input stage producing first and second alternating cyclic signals and a transformer connected to the input stage. The transformer has an output winding; the output winding has first and second output terminals associated with the first and second alternating cyclic signals. There is also an output stage connected to the transformer. There is also a first transistor having a conduction path associated with the first output terminal and ground for rectifying a first signal present on the first output terminal. The first transistor has a control terminal to regulate a first signal flowing through the conduction path by a first control signal. Also the first transistor has a lower voltage drop in its conduction path than one for a Schottky diode. There is also a first diode associated with the first output terminal for controlling a first ringing signal present on the first signal when the first alternating cyclic signal becomes positive. There is also a second transistor having a second conduction path associated with the second output terminal and the ground for rectifying a second signal present on the second output terminal. The second transistor has a second control terminal to regulate a second signal flowing through the conduction path by a second control signal. Also the second transistor has a lower voltage drop in its conduction path than one for a Schottky diode. A second diode is with the second output terminal for controlling a second ringing signal present on the second signal when the second alternating cyclic signal becomes positive. There is also an energy storage device associated with the first and second clamping means to store energy from the first and second ringing signals.

The DC/DC converter may have a capacitor as the energy storage device and may have FETs for the first and second transistors. Further, the energy stored in the capacitor may be provided to drive the first and second transistors.

The DC/DC converter may further have a third transistor connected in parallel with the first transistor and a fourth transistor connected in parallel with the second transistor. The third transistor is controlled by the first control signal and the fourth transistor is controlled by the second control signal.

The DC/DC converter may have FETs for the third and fourth transistors.

The DC/DC converter may arrange the output winding and the first and second output terminal to be in a center tap configuration.

The DC/DC converter may arrange the output winding and the first and second output terminal in a current doubler configuration.

In a third aspect, the invention provides a method of controlling power loss at an output stage of a DC/DC converter. The output stage of the DC/DC converter has an output winding; the output winding has first and second output terminals; the output stage produces a first alternating cyclic signal on the first output terminal and a second complementary alternating cyclic output signal on the second output terminal. The method comprises controlling a first ringing signal at the first output terminal utilizing a first transistor, controlling a second ringing signal at the second output terminal utilizing a second transistor. Each of the first and second transistors has a lower voltage drop in their conduction path than one for a Schottky diode. The method further comprises clamping a first ringing signal on the first output terminal to a first value, clamping a second ringing signal on the second output terminal to a second value, storing excess energy from the first and second ringing signals in a storage device; and connecting the storage device to control terminals of the first and second transistors.

In other aspects, the invention provides various combinations and subsets of the aspects described above.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes):

FIG. 2A is an ideal secondary transformer voltage time waveform for the DC/DC converter of FIG. 1;

FIG. 2B is voltage time waveform for a gate driver associated with the synchronous rectifier circuit of FIG. 1;

FIG. 2C is voltage time waveform for voltage appearing across drain to ground for the synchronous rectifier circuit of FIG. 1;

FIG. 2D is a current time waveform for current flowing through a diode and a FET in the synchronous rectifier circuit of FIG. 1;

FIG. 2E is another current to time waveform for current flowing through a Schottky diode associated with the synchronous rectifier circuit of FIG. 1;

FIG. 2F is yet another current time waveform for current flowing through a FET for the synchronous rectifier circuit of FIG. 1;

DETAILED DESCRIPTION OF THE PREFERRED EMBODIMENTS

Figure 1:
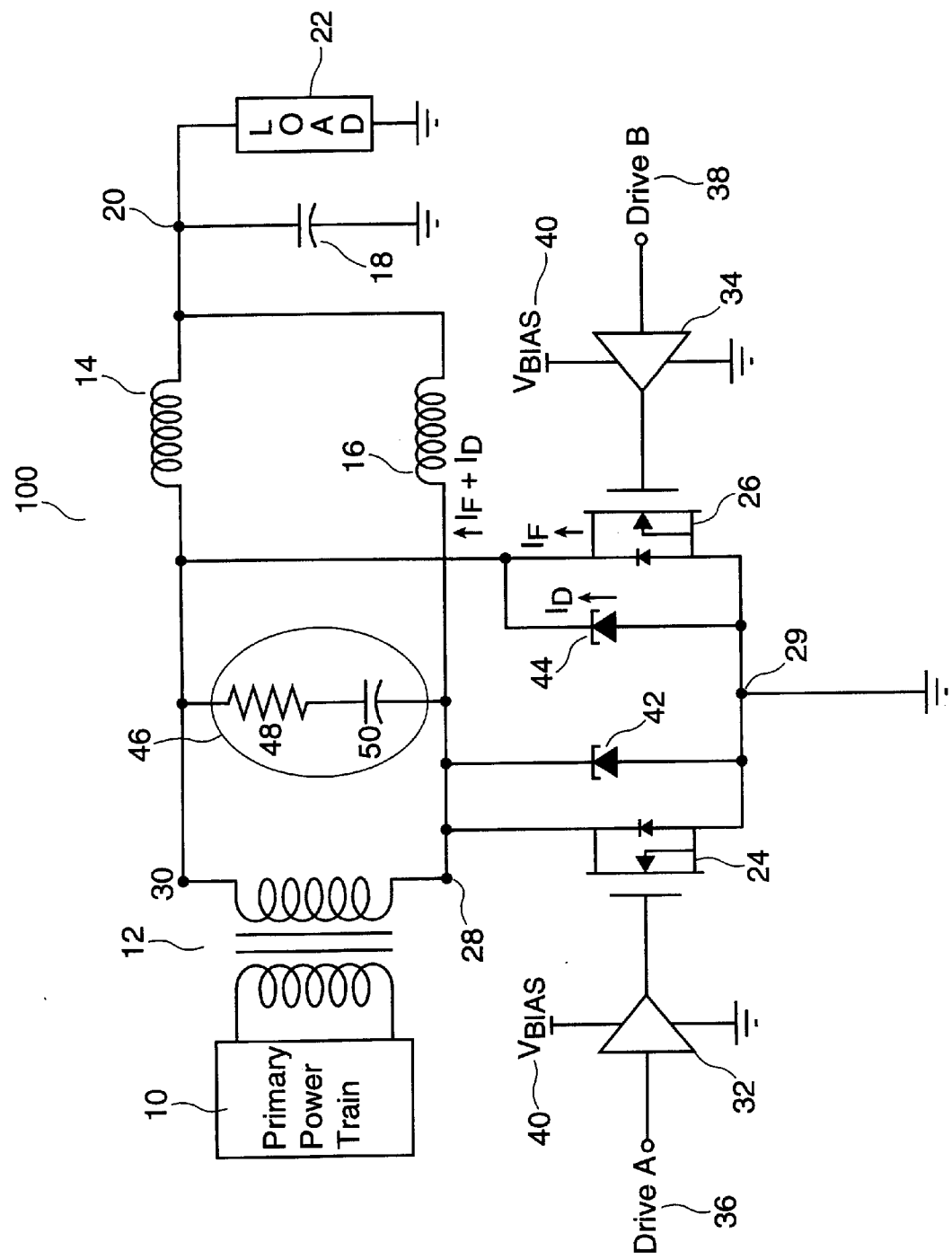
FIG. 1 is a block diagram of a prior art synchronous rectifier circuit used in a DC/DC converter.

The description which follows, and the embodiments described therein, are provided by way of illustration of an example, or examples of particular embodiments of the principles of the present invention. These examples are provided for the purposes of explanation, and not limitation, of those principles and of the invention. In the description, which follows, like parts are marked throughout the specification and the drawings with the same respective reference numerals.

FIG. 1 shows circuit 100, which comprises a DC/DC converter circuit having a synchronous rectifier. The primary power train 10 is a fullbridge converter circuit topology which is connected to output transformer 12. The output is configured as a current doubler configuration. Output terminals 28 and 30 present taps for output signals of transformer 12. It will be appreciated that using the fullbridge converter circuit topology, the signals on output terminals 28 and 30 are complementary alternating cyclic signals which are out of phase by 180° with each other (see FIG. 2A). The signals from terminals 28 and 30 are separately filtered through output inductors 14 and 16 and combined at node 20 to produce a steady DC voltage. Output capacitor 18 conditions the output voltage at node 20 for load 22.

FET 24 has its drain connected to output terminal 28 and its source connected to ground 29. Accordingly, its conduction path is from output terminal 28 to ground. Gate driver 32 is connected to theg ate of FET 24, thereby controlling the conduction of current of FET 24. Schottky diode 42 is connected to ground 29 at its anode and output terminal 28 at its cathode. FET 24 conducts when current flows in the same direction as diode 42. If the voltage at node 28 is positive, diode 42 does not conduct and FET 24 does not conduct. Accordingly, FET 24 is deactivated, i.e. "off", when the voltage at node 28 is positive. At other times, FET 24 conducts.

Similarly, FET 26 has its drain connected to output terminal 30 and its source connected to ground 29. Gate driver 34 is connected to the gate of FET 26. Schottky diode 44 is connected to ground 29 at its anode and output terminal 30 at its cathode.

For the embodiment, the operation and control of FETs 24 and 26 are substantially symmetrical. FET 24 is de-activated within the positive cycle of the output signal present at terminal 28. The control signal causing FET 24 to conduct is produced by gate driver 32. The gate drive control signal is provided by drive A signal 36. Similarly, FET 26 is de-activated, i.e. does not conduct, within the positive cycle of the output signal present at terminal 30. The control signal causing FET 26 to conduct is produced by gate driver 34. The gate drive control signal is provided by drive B signal 38. The circuit generating drive B signal 38 is not shown. It will be apprecited that drive B signal 38 may be generated and controlled by methods known in the art. For example, drivers such as model MIC4420 from Micrel, Inc. of San Jose, California may be used as gate driver 34. It will be appreciated that other drivers known in the art may be used to provide the same function as the MIC4420 device for the embodiment.

Given the symmetry of signals and components about terminals 28 and 30, it will be understood that descriptions of signals relating to output terminal 28, FET 24 and its related control elements are applicable, when appropriately shifter in phase, to respective signals at terminal 30, FET 26 and its control signals, unless otherwise noted.

The control signal for gate driver 34 is drive B signal 38. Power to gate driver 34 is provided from $V_{bias}$ signal 40 representing the maximum gate-source drive voltage for FET 26. It can be appreciated that other semiconductor technologies may be used in place of FETs 24 and 26, as is known in the art.

Drive B signal 38 (FIG. 2B) is initiated to cause FET 26 to turn on, i.e. allow conduction of current through its body, after there is forward current flow in Schottky diode 44. When FET 26 conducts, current flows from ground node 29 through the channel of FET 26 to terminal 30. This current is allowed to conduct only when the secondary transformer voltage is not greater than 0V. The voltage for terminal 30 is shown in FIG. 2C. The current flowing through FET 26 and diode 44 is shown in FIG. 2D.

In normal operation, when current starts to flow through terminal 30, Schotkky diode 44 begins to conduct. This is known as the leading edge and is shown in FIG. 2E. Next, after a short period of time (generally in the order of 100ns), drive B signal 38 is initiated (FIG. 2B), thereby driving gate driver 34 and causing FET 26 to be turned on. FET 26 conducts (FIG. 2F) when the signal present at terminal 30 is 0 volts or less (FIG. 2C). As the output at terminal 30 increases from a negative value or 0 value to a positive value, current from terminal 30 decreases. About this time, drive B signal 38 is deactivated and gate control driver 34 is turned off, which turns off FET 26. FET 26 is turned off approximately 100ns before the voltage through transformer 12 changes polarity. This is known as the trailing edge and is shown in FIG. 2F. If FET 26 conducted when the output on transformer 12 changes polarity, transformer 12 secondary winding would be shorted.

Accordingly, any residual current from terminal 30 is blocked from flowing through FET 26 and flows through Schottky diode 44; diode 44 prevents possible shoot-through of current at terminal 30, which may be caused by a variation in timing signals due to component tolerances.

Snubber circuit 46 is provided to absorb excess energies from synchronous rectifier circuit 100 and comprises resistor 48 and capacitor 50. Snubber circuit 46 dampens ringing of signals at terminals 28 and 30 due to leakage inductance of transformer 12 and capacitance present in FETs 24 and 26 and diodes 42 and 44. This allows the use of lower voltage rated devices for FETs 24 and 26 and diodes 42 and 44 in the circuit and reduces electromagnetic interferences (EMI) due to high frequency ringing present in the signal.

Figure 3:
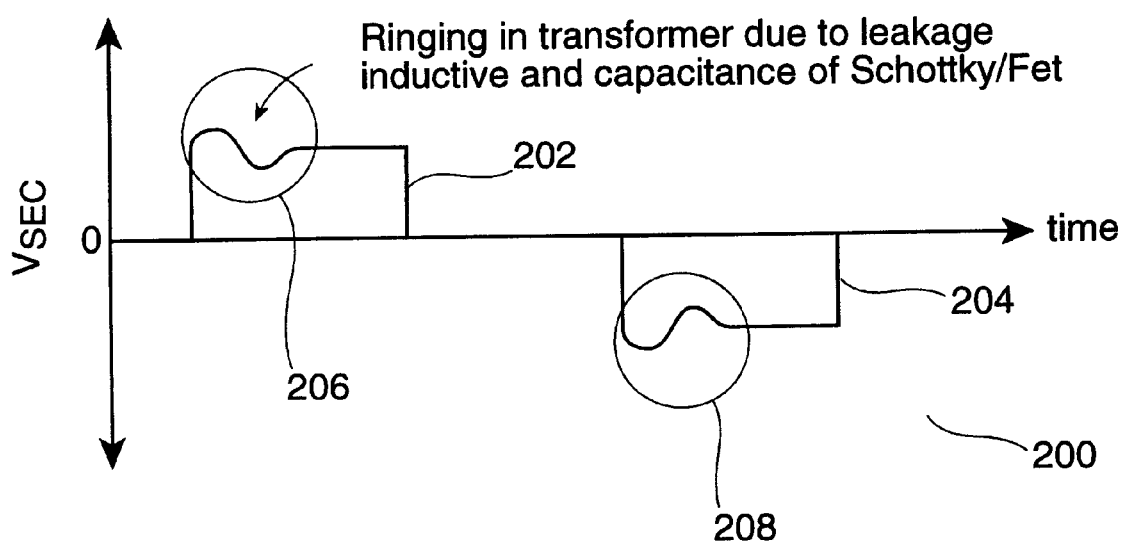
FIG. 3 is still yet another voltage time waveform for actual voltage appearing across the secondary side of transformer of the synchronous rectifier circuit of FIG. 1.

Referring to FIG. 3, plot 200 shows the actual voltage across terminal 28 and 30. Ringing on transformer 12 due to leakage inductance and capacitance in FET 26 and Schottky diode 44 is shown in section 206 of curve 202. Ringing on transformer 12 due to leakage inductance and capacitance in FET 24 and Schottky diode 42 is shown in section 208.

Circuit 100 has inherent power efficiency losses. When the Schottky diode 33 is conducting and FET 26 is turned on, the current from Schottky diode 42 does not transfer instantaneously from Schotkky diode 44 to FET 26 as shown via dotted line 200 in FIGS. 2E and 2F. Instead, due to inherent inductances present in devices in circuit 100, the current ramps down in the Scottky diode 44 and simultaneously ramps up in the FET 26. This is shown in FIG. 2E and 2F as line 210, with reference to "Conduction Power loss in MOSFET Synchronous Rectifier with Parallel-Connected Schottky Barrier Diode", described earlier. Typically, the ramp time for the current can be anywhere from 500 ns to $1\mu$. For high-speed DC/DC converters the ramp time is a significant portion of the cycle time which reduces the effectiveness of the synchronous rectifier and thus the efficiency of the regulator.

Figure 5:
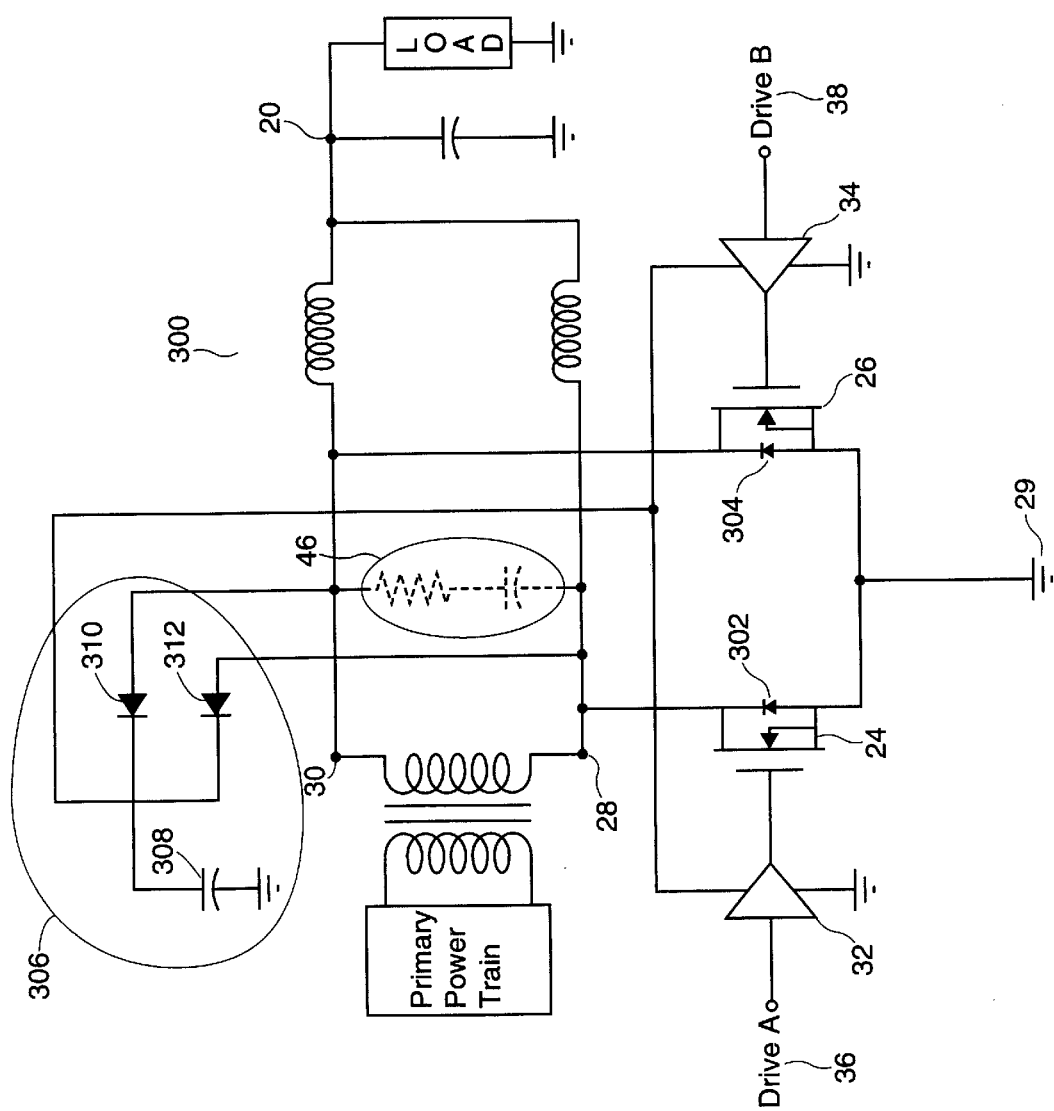
FIG. 5 is a block diagram of an embodiment of a synchronous rectifier circuit of the invention used in a DC/DC converter.

Referring to FIG. 5, the embodiment of circuit 300 improves the efficiency of voltage transfers of circuit 100. In power loss reduction circuit 300, Schottky diodes 42 and 44 are removed. Built-in body diode 302 and 304 in FETs 24 and 26 replace functionality provided by Schottky diodes 42 and 44.

Figure 6A:
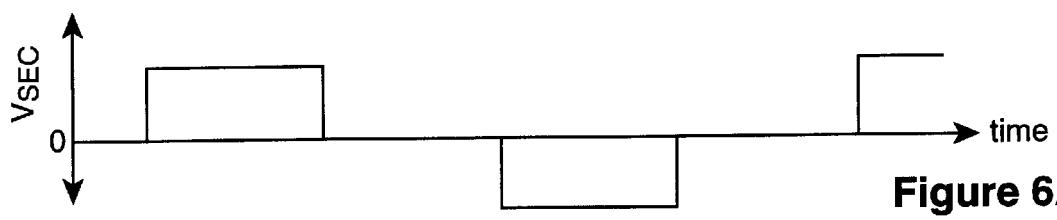
FIG. 6A is a voltage time waveform for an ideal secondary transformer of the DC/DC converter of FIG. 5.
Figure 6B:
FIG. 6B is voltage time waveform for a gate driver associated with the synchronous rectifier circuit of FIG. 5.
Figure 6C:
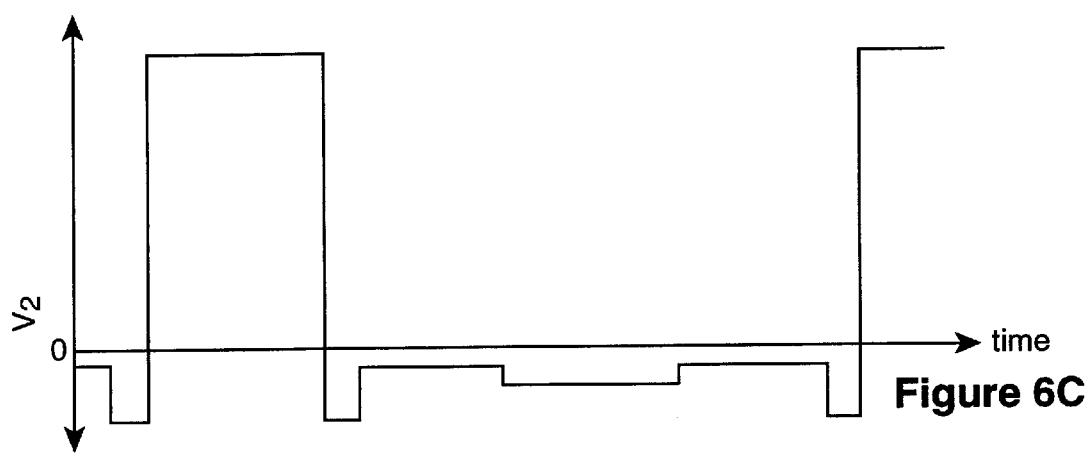
FIG. 6C is voltage time waveform for voltage appearing across drain to ground of the synchronous rectifier circuit of FIG. 5.
Figure 6D:
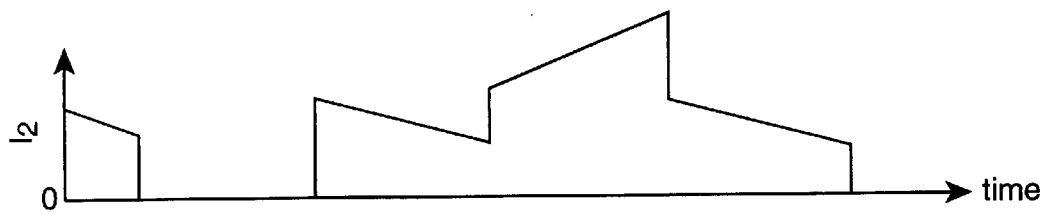
FIG. 6D is a current time waveform for current flowing through a FET of the synchronous rectifier circuit of FIG. 5.

A description of the operation of circuit 300 is provided through elements associated with FET 26. It will be appreciated that a similar circuit, with similar signals, appropriately delayed, involves FET 24. FIG. 6A shows the ideal secondary transformer voltage across terminal 30 to terminal 28. Approximately 100ns after current starts to flow through terminal 30, drive B signal 38 is initiated, thereby driving gate driver 34 and causing FET 26 to be turned on. Gate signal is shown in FIG. 6B. FET 26 conducts through the positive cycle of the signal present at terminal 30. As the output signal at terminal 30 increases from a negative value to a positive value, current from terminal 30 decreases. About this time, drive B signal 38 is deactivated and gate control driver 34 is turned off, which turns off FET 26. FET 26 is turned off approximately 100ns before the voltage through transformer 12 changes polarity. When FET 26 is turned off, body diode 304 will turn on for a short period of time, typically for approximately 100ns, as current still flows from transformer 12 and output terminal 30 until the voltage in transformer 12 changes polarity as shown in FIG. 6D.

As body diode 394 is not ideal, it may store a significant amount of a reverse recovery charge, which may discharge slowly. The stored charge therein results from diode 304 conducting in the forward direction and storing minority carries near its junction. In order to turn off diode 304, this charge must be removed or the charge must be dissipated. To remove this charge, a momentary current flow in the reverse direction is required. This occurs when the transformer voltage at terminal 30 becomes positive. The amount of power needed to remove the charge out may be of a few watts. In comparison, a Schottky diode 44 has a capacitance, but does not store a charge. Therefore less power is required to dissipate the energy stored therein.

One approach to dissipating reverse recovery charge is to use snubber circuit 46 and increase the size of its components, namely the value of resistor 48 and capacitor 50. However, from an efficiency point of view, decreasing the values of resistor 48 or increasing the value of capacitor 50 would lead to more energy being absorbed into the larger valued components, thereby reducing efficiency.

Therefore removing the Schottky diode improves the current transfer from Schottky diode to the corresponding FET during the leading edge (leading edge FIGS. 2E, 2F) but circuit 300 accordingly requires more power to dissipate the reverse recovery charge. As such, circuit 300 has clamping circuit 306 elsewhere in circuit 300. Clamping circuit 306 clamps the output voltage of transformer 12 close to the secondary transformer voltage (which is the input voltage divided by the turns ratio) of transformer 12 and the excessive energy is absorbed into capacittor 308. Typically, ringing would be present in the output signal of transformer 12 when the output changes polarity and body diode 32 turns off.

Diodes 310 and 312 clamp the voltage signal on each output terminal 28 and 30. Without circuit 306, the output voltage would ring from 15V to 20V and would decay slowly as shown with FIG. 4. With the clamping circuit 306, the output voltage at each output terminal may peak up to 10V but would then decay rapidly to 6.8V, the transformer secondary steady state voltage as shown with FIG. 7. Since the energy in the ringing voltage is absorbed into capacitor 308 and the power is used elsewhere, the power losses for circuit 300 are reduced. In the embodiment, the power losses are reduced to a point where snubber circuit 46 is not required for circuit 300. Accordingly snubber circuit 46 is shown in broken lines in FIG. 5. The absence of snubber circuit 46 provides a 0.2% efficiency improvement.

Figure 4:
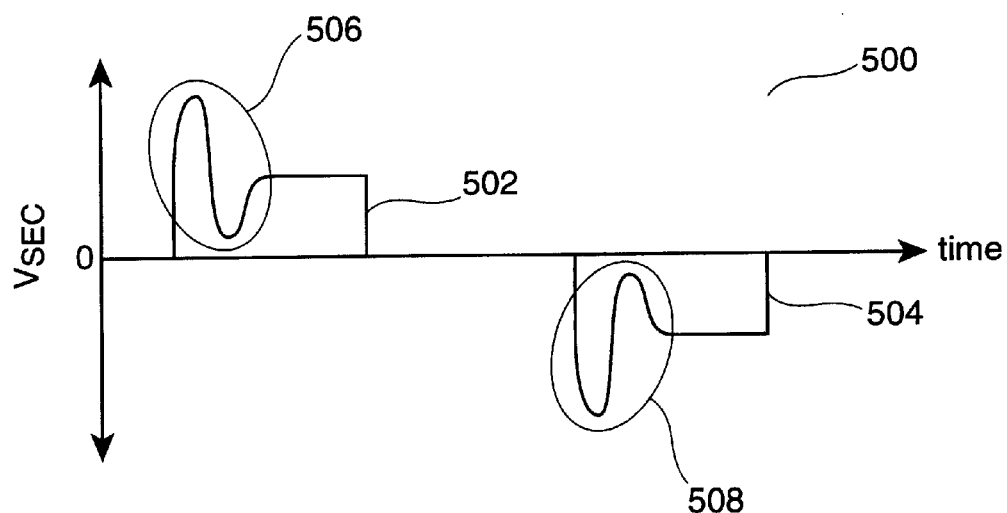
FIG. 4 is still yet another voltage time waveform for voltage appearing across the secondary side of transformer with Schottky diode removed for synchronous rectifier circuit of FIG. 1.
Figure 7:
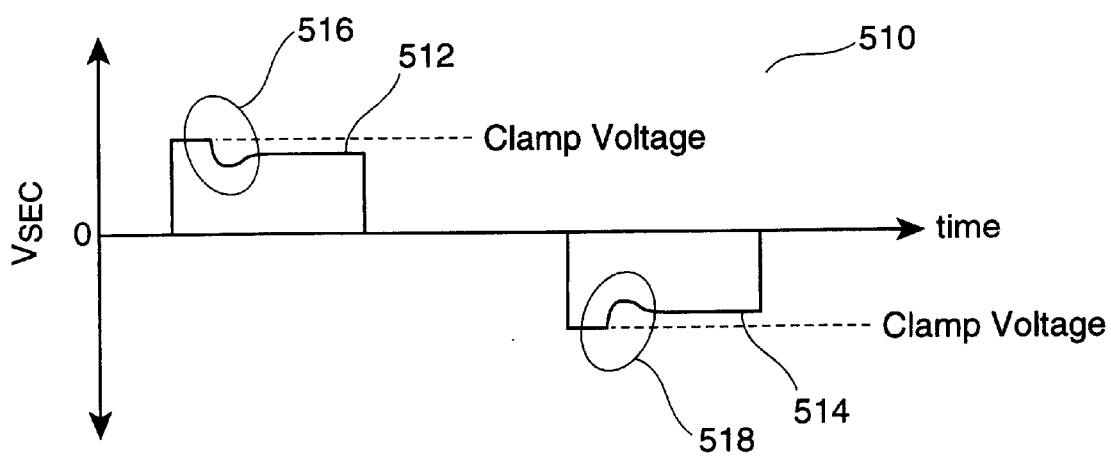
FIG. 7 is still yet another voltage time waveform for voltage appearing across the secondary side of transformer with synchronous rectifier circuit of FIG. 5.

Referring to FIGS. 4 and 7, plot 500 shows the output voltage at terminal 28 of circuit 300 in curve 502 and voltage at terminal 30 in curve 504. Ringing on transformer 12 due to leakage inductance and capacitance in FET 24 without any Schottky diode is shown in section 506 of curve 502. Ringing on transformer 12 due to leakage inductance and capacitance in FET 26 without any Schottky diode is shown in section 508 of curve 504.

When clamping circuit 306 is utilized in circuit 300, ringing voltages at output terminals 28 and 30 decrease. Plot 510 shows the output voltage at terminal 28 of circuit 300 in curve 512 and voltage at terminal 30 in curve 514 with clamping circuit 306 in place. Ringing on transformer 12 due to leakage inductance and capacitance in FET 24 with clamping circuit 306 is shown in section 516 of curve 512. Ringing on transformer 12 due to leakage inductance and capacitance in FET 26 with clamping circuit 306 is shown in section 518 of curve 514. It can be appreciated that the ringing in sections 516 and 518 are clamped and damped as compared with sections 506 and 508 in plot 500. The limiting of the overshoot in plot 510 improves the efficiency of circuit 300. This would also allow the use of lower-rated voltage devices for FETs 24 and 26.

FET 24 and 26 also require a relatively large amount of power to drive them. FET 24 has an extremely high gate capacitance because of its low $R_{ds}$-on values and the gate capacitance which must be charged and discharged every output waveform cycle. The drive loss may approach 3 W representing a 1.5% efficiency loss for FET 24. An equation which provides the loss of a converter is:

$$\text{Loss (W)} = 0.5 * f * C * V^2, \quad \text{(Equation 1)}$$

Where loss is in watts, f is the switching frequency of the circuit, C is the gate capacitance and V is the drive voltage. It will be appreciated that Equation 1 is based on the power required to charge the gate capacitance.

One method to reduce the power loss is to use a lower drive voltage for FET 24, such as 6V. By using a drive voltage of approximately half the original value of 12V, the power required to drive FET 24 is reduced accordingly to one-quarter of the original value through Equation 1. This assumes that the same $R_{ds}$-on can be obtained with the lower drive voltage.

However, in a practical circuit, typically only a 12V supply is available in most DC/DC converters. Accordingly, a 6V signal would have to be independently generated. The power losses in producing 6V from 12V, would offset and negate benefits of utilizing a lower drive voltage for FET 24.

If the stored energy in capacitor 308 is not used, the voltage stored in capacitor 308 may rise to approximately 15 to 20V. Therefore, to conserve energy in the circuit 300 energy in capacitor 308 is utilized to supply power to gate drivers 32 and 34, thus driving the synchronous rectifier circuit 300 at a lower voltage (6.8V in this case), as shown in FIG. 5. This configuration improved the efficiency by 1% over the prior art.

Figure 8:
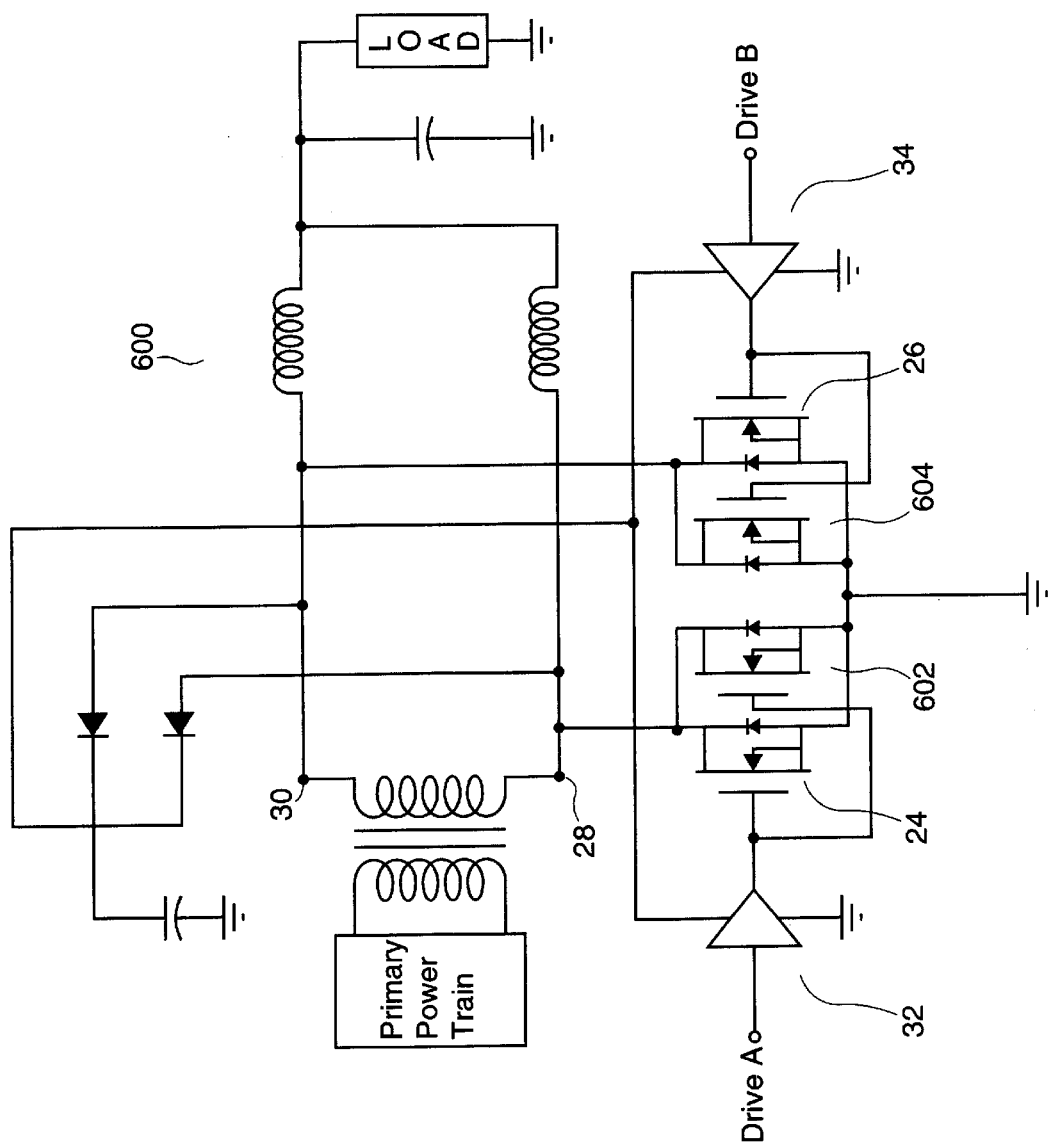
FIG. 8 is a block diagram of another embodiment of a synchronous rectifier circuit of the invention used in a DC/DC converter.

The cumulative improvement in efficiencies using aspects described for circuit 300 over the efficiency level of circuit 100 provides an improvement of 2.5% over circuit 100. a Referring to FIG. 8, circuit 600 comprises similar elements of circuit 300 (FIG. 5); however, FET 602 is connected in parallel with to FET 24 and FET 604 is connected in parallel with to FET 26. Gate drivers 32, 34 provide $V_{bias}$ to FETs 602 and 604. It can be appreciated that FETs 602 and 604 may physically be inserted into the locations in a printed circuit board (not shown) where Schottky diodes 42 and 44 would have been located in circuit 100 (FIG. 1). FETs 602 and 604 provide further efficiencies to circuit 600 over circuit 300. Use of FETs 602 and 604 improve efficiencies for circuit 600 because when FETs 24 and 602 are in a parallel circuit configuration, the total $R_{ds}$-on for the synchronous rectifier circuit associated with terminal 28 is reduced. Accordingly, the forward voltage drop in circuit 600 is smaller than the forward voltage drop in circuit 300, on a component-for-component comparison. This further reduces total power loss and improves efficiency.

It will be appreciated that FETs, in particular, MOSFETs, provide a switching device for circuit 100. In operation, FETs at a high current provide a voltage drop across their conduction path which is lower than a voltage drop for a Schottky diode. Accordingly, it will be appreciated that a switching device, technology or circuit design, which provides the voltage drop characteristics of a FET, may be used instead of a FET in the embodiments.

It will be appreciated that the clamping circuit 306 may be used with any bipolar driven topology, such as Push-Pull, Half-Bridge, Fullbridge, ZVS Fullbridge, or other known in the art. Further, the output transformer can be either a center tap or current doubler configuration as shown here. In addition, the energy from capacitor 308 does not need to go directly to the drivers. It may be used for a 12V bias by clamping the ringing to 12V or to any other load.

It is noted that those skilled in the art will appreciate that various modifications of detail may be made to the present embodiment, all of which would come within the scope of the invention.

What is claimed is:

1. A power loss reduction circuit for use in an output stage of a voltage converter, said output stage having an output winding, said output winding having first and second output terminals, said output stage producing a first alternating cyclic signal on said first output terminal and a second complementary alternating cyclic output signal on said second output terminal, said power loss reduction circuit comprising:

a first transistor having a conduction path associated with said first output terminal and ground for rectifying a first signal present on said first output terminal, said first transistor having a first control terminal to regulate a first signal flowing through said conduction path by a first control signal and having a lower voltage drop in said conduction path than another voltage drop for another conduction path for a Schottky diode;

a first clamping circuit associated with said first output terminal for reducing a first ringing signal present on said first signal when said first alternating cyclic signal becomes positive;

a second transistor having a second conduction path associated with said second output terminal and said ground for rectifying a second signal present on said second output terminal, said second transistor having a second control terminal to regulate a second signal flowing through said conduction path by a second control signal and having a lower voltage drop in said second conduction path than said another voltage drop for said Schottky diode;

a second clamping circuit associated with said second output terminal for reducing a second ringing signal present on said second signal when said second alternating cyclic signal becomes positive; and an energy storage device associated with said first and second clamping circuits to store energy from said first and second ringing signals.

2. A power loss reduction circuit as claimed in claim 1 wherein said first and second clamping circuits comprise diodes.

3. A power loss reduction circuit as claimed in claim 2 wherein said energy storage device is a capacitor and said first and second transistors are FETs.

4. A power loss reduction circuit as claimed in claim 2 wherein said energy storage device is a capacitor and said first and second transistors are MOSFETs.

5. A power loss reduction circuit as claimed in claim 3 wherein said energy stored in said capacitor is provided to drive said first and second transistors.

6. A power loss reduction circuit as claimed in claim 5 further comprising:
   a third transistor in a parallel connection with said first transistor, said third transistor controlled by said first control signal; and
   a fourth transistor in a parallel connection with said second transistor, said fourth transistor controlled by said second control signal.

7. A power loss reduction circuit as claimed in claim 6 wherein said third and fourth transistors are FETs.

8. A power loss reduction circuit as claimed in claim 3 wherein said output winding and said first and second output terminal are arranged in a center tap configuration.

9. A power loss reduction circuit as claimed in claim 3, wherein said output winding and said first and second output terminal are arranged in a current doubler configuration.

10. A DC/DC voltage converter comprising
   an input stage producing a first and second alternating cyclic signals; a transformer connected to said input stage, said transformer having an output winding, said output winding having first and second output terminals associated with said first and second alternating cyclic signals;
   an output stage connected to said transformer;
   a first transistor having a conduction path associated with said first output terminal and ground for rectifying a first signal present on said first output terminal, said first transistor having a first control terminal to regulate a first signal flowing through said conduction path by a first control signal and having a lower voltage drop in said conduction path than another voltage drop for another conduction path for a Schottky diode;

a first diode associated with said first output terminal for controlling a first ringing signal present on said first signal when said first alternating cyclic signal becomes positive;

a second transistor having a second conduction path associated with said second output terminal and said ground for rectifying a second signal present on said second output terminal, said second transistor having a second control terminal to regulate a second signal flowing through said conduction path by a second control signal and having a lower voltage drop in said second conduction path than said another voltage drop for said Schottky diode;

a second diode associated with said second output terminal for controlling a second ringing signal present on said second signal when said second alternating cyclic signal becomes positive; and an energy storage device associated with said first and second clamping means to store energy from said first and second ringing signals.

11. A DC/DC converter as claimed in claim 10 wherein said energy storage device is a capacitor, and said first and second transistors are FETs.

12. A DC/DC converter as claimed in claim 11 wherein said energy stored in said capacitor is provided to drive said first and second transistors.

13. A DC/DC converter as claimed in claim 12 further comprising:
   a third transistor connected in parallel with said first transistor, said third transistor controlled by said first control signal; and
   a fourth transistor connected in parallel with said second transistor, said fourth transistor controlled by said second control signal.

14. A DC/DC converter as claimed in claim 13 wherein said third and fourth transistors are FETs.

15. A DC/DC converter as claimed in claim 11 wherein said output winding and said first and second output terminal are arranged in a center tap configuration.

16. A DC/DC converter as claimed in claim 11 wherein said output winding and said first and second output terminal are arranged in a current doubler configuration.

17. A method of controlling power loss at an output stage of a DC/DC converter, said output stage of said DC/DC converter having an output winding, said output winding having first and second output terminals, said output stage producing a first alternating cyclic signal on said first output terminal and a second complementary alternating cyclic output signal on said second output terminal, said method comprising:
   controlling a first ringing signal at said first output terminal utilizing a first transistor;
   controlling a second ringing signal at said second output terminal utilizing a second transistor, each of said first and second transistors having a lower voltage drop in a conduction path than another voltage drop for another conduction path for a Schottky diode;
   clamping a first ringing signal on said first output terminal to a first value; clamping a second ringing signal on said second output terminal to a second value;
   storing excess energy from said first and second ringing signals in a storage device; and
   connecting said storage device to control terminals of said first and second transistors.

* * * * *